(12) United States Patent
Davidson

(10) Patent No.: US 6,779,295 B2
(45) Date of Patent: Aug. 24, 2004

(54) FISH HOOK

(76) Inventor: Lawrence P. Davidson, 29 Smallwood St., Indian Orchard, MA (US) 01151

( * ) Notice: Subject to any disclaimer, the term of this patent is extended or adjusted under 35 U.S.C. 154(b) by 95 days.

(21) Appl. No.: 09/880,382

(22) Filed: Jun. 13, 2001

(65) Prior Publication Data

US 2002/0017051 A1 Feb. 14, 2002

Related U.S. Application Data

(60) Provisional application No. 60/216,167, filed on Jul. 6, 2000.

(51) Int. Cl.[7] .............................................. A01K 83/00
(52) U.S. Cl. ....................................................... 43/43.16
(58) Field of Search ........................... 43/43.16, 44.82, 43/44, 42.39, 44.8

(56) References Cited

U.S. PATENT DOCUMENTS

| | | | | |
|---|---|---|---|---|
| 2,266,725 A | * | 12/1941 | Andrews | .................... 43/44.8 |
| 2,922,247 A | * | 1/1960 | Buss | .......................... 43/44.8 |
| 2,979,852 A | * | 4/1961 | Schinke et al. | ............. 43/43.16 |
| 3,026,647 A | * | 3/1962 | Rainey | ........................ 43/44.8 |
| 3,879,886 A | * | 4/1975 | Thomas | ...................... 43/44.8 |
| 4,232,470 A | * | 11/1980 | Steffick, Jr. | ................. 43/43.16 |
| 4,470,217 A | * | 9/1984 | Adams | ........................ 43/44.8 |
| 4,937,966 A | * | 7/1990 | McKenzie | .................. 43/44.8 |
| 5,105,575 A | * | 4/1992 | Robertaccio | ................. 43/44.8 |
| 5,664,364 A | * | 9/1997 | Clark | .......................... 43/43.16 |
| 6,189,257 B1 | * | 2/2001 | Ulrich | ........................ 43/43.16 |

* cited by examiner

Primary Examiner—Kurt Rowan
Assistant Examiner—Bethany L Griles
(74) Attorney, Agent, or Firm—Cantor Colburn LLP

(57) ABSTRACT

A fish hook formed from a wire has a first end adapted for attachment with a line and a second end comprising a point directed in the general direction of the first end. An intermediary portion extending from the first end to the point includes a shank extending away from the first end and a bent section. An offset is formed into the bent section, is arranged substantially perpendicular to the point, and is dimensioned to support and maintain an accessory thereon.

11 Claims, 2 Drawing Sheets

FISH HOOK

CROSS-REFERENCE TO RELATED APPLICATION

This application claims benefit of Provisional U.S. Application No. 60/216,167 filed Jul. 6, 2000, which is incorporated by reference herein in its entirety.

BACKGROUND

This invention relates to a particularly advantageous fish hook characterized by an offset in the lower portion of the hook. The offset is useful for locking into place artificial or natural lures or other accessories.

There are many products on the market today for the recreational fisher to help lure and catch fish using a simple fish hook, including life-like soft plastic lures, spinners, trailer hooks, buzz baits, and jigs, to name a few. A common problem faced by fishermen and women is the failure of a lure, bait, trailer hook, or other accessory, to stay in the proper position on a hook so that the accessory serves its purpose. For example, if a plastic lure moves up the shank from its proper position, the natural movement of the lure may be impaired.

SUMMARY

These and other problems are overcome by a fish hook formed from a wire and having a first end adapted for attachment with a line and a second having a point directed in the general direction of the first end. An intermediary portion extending from the first end to the point includes a shank extending away the first end and a bent section. An offset is formed into the bent section, is arranged substantially perpendicular to the point, and is dimensioned to support and maintain an accessory thereon.

BRIEF DESCRIPTION OF THE DRAWINGS

In illustration of the preferred embodiments, drawings are provided herewith in which.

DETAILED DESCRIPTION OF THE PREFERRED EMBODIMENTS

Figure 1:
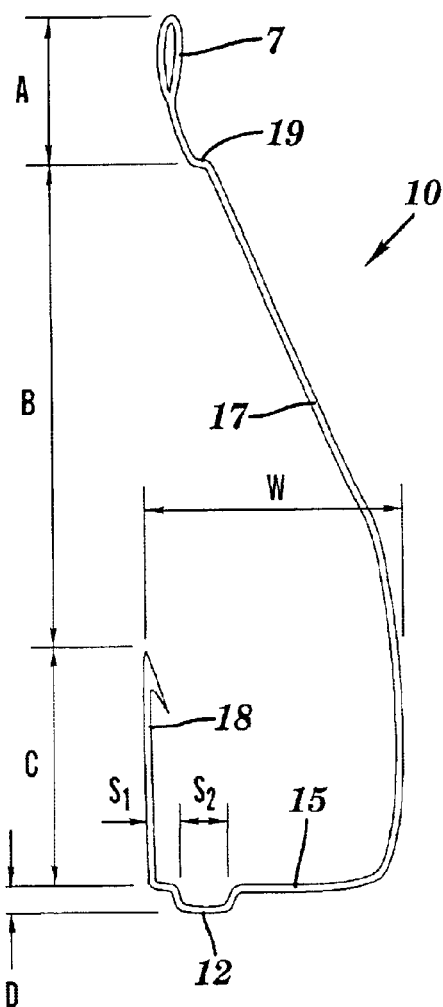
FIG. 1 shows an exemplary fish hook according to a first embodiment.

Referring to FIG. 1, a first embodiment of the invention is shown in which hook 10 includes an eye 7 for attaching hook 10 to a line, top offset 19, shank 17, lower portion 15, and point 18. Although the point is shown extending generally vertically to eye 7, it may be preferably slightly curved toward shank 17, e.g., at an angle of approximately 5 degrees. Hook 10 further includes an offset 12 in lower portion 15 thereof. Secondary offset $S_1$ provides a means for positioning the lure or additional hook a distance from point 18.

Figure 1A:
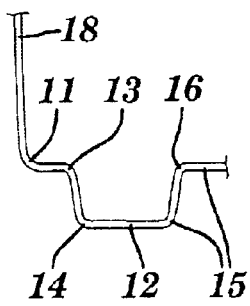
FIG. 1a shows a detail of a portion of the fish hook of FIG. 1.

Offset 12, integrally formed from the wire from which hook 10 is made, is shown in more detail in FIG. 1a. Following the wire down from point 18, the wire is first bent into curve 11 and extends transversely a distance $S_1$ to right angle bend 13, from which the wire is directed substantially downwardly as viewed in FIGS. 1 and 1a. The wire extends substantially downwardly a distance D, then enters another angle bend 14 after which it extends transversely a distance $S_2$. This transverse portion represents offset 12, which, as will be further described, can also be referred to as a "lure seat." From offset 12, the wire is bent into two more right angle bends 15 and 16 to complete offset 12 as shown in FIG. 1a. Each right angle bend described is sufficiently tight to prevent a lure or other accessory from sliding up shank 17 or point 18 during use.

While the relative dimensions of the hook are important, the overall size of the hook should be matched with the intended prey and/or lure. In this case, dimensions W, B, and C are relevant dimensions for capturing a fish of a specific size, while dimension $S_2$ is relevant for holding in place the lure or trailer hook of a desired size. Obviously, larger prey will be attracted to larger sized lures as well as need larger hooks so that as the dimensions W, B, and C, are increased to capture a larger fish, dimension $S_2$ will, in general, also be advantageously increased.

The following is a table loosely setting forth approximate dimensions for one particular size, which dimensions may be scaled for larger or smaller sized hooks:

| Dimension | Size |
| --- | --- |
| A | ½" (1.3 cm) |
| B | 1 ¾" (4.5 cm) |
| C | ½–⅝" (1.6 cm) |
| D | ⅛" (0.4 cm) |
| W | ⅞" (2.8 cm) |
| $S_1$ | ⅛" (0.4 cm) |
| $S_2$ | 3/16" (0.5 cm) |

Figure 2:
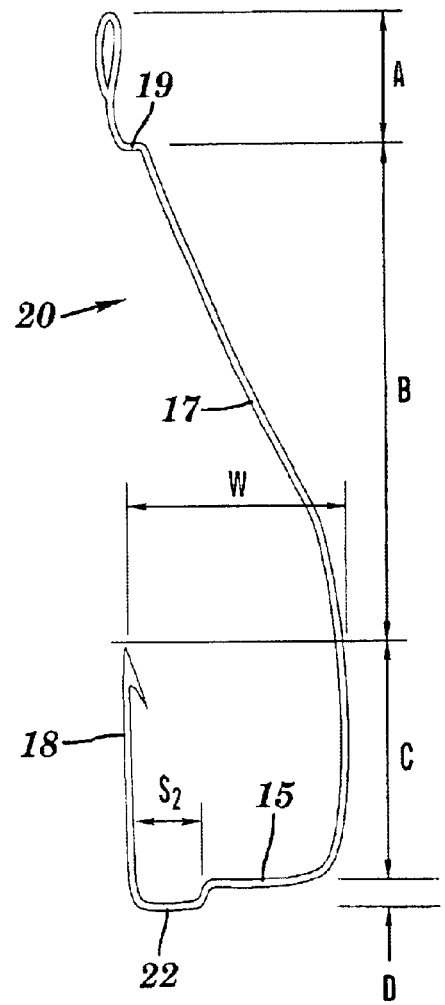
FIG. 2 shows an exemplary fish hook according to a second embodiment.

FIG. 2 shows a second embodiment in which hook 20 includes offset 22 in lower portion 15 adjacent to point 18 of the hook. The dimensions of the above table apply to the embodiment of FIG. 2 as well as that of FIG. 1.

Figure 3:
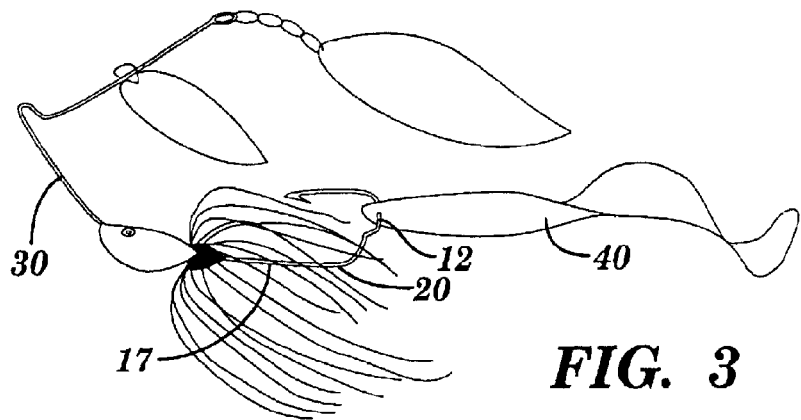
FIGS. 3, 4, 5, and 6 show various applications of the fishing hook of FIG. 2.
Figure 4:
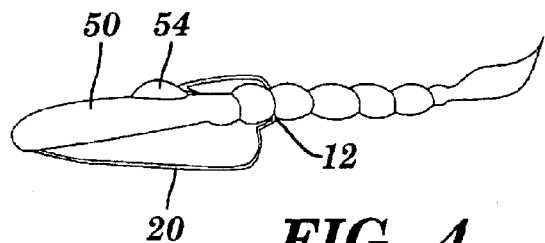

FIGS. 3, 4, 5, and 6 show exemplary applications of the hook. In FIG. 3, a spinner bait 30 is attached at one end of hook 20 and lure 40 is attached at offset 12 of hook 20. It can be seen that offset 12 prevents lure 40 from rotating on hook 20 and sliding up point 18 or shank 17. In FIG. 4, a plastic worm 50 according to U.S. Pat. No. 5,379,544 issued Jan. 10, 1995, and incorporated herein by reference is applied. Plastic worm 50 is pierced by hook 20 and positioned on offset 12 of hook 20. Dorsal 54 of plastic worm 50 conceals the point of hook 20. Again, offset 12 works to maintain worm 50 in an optimal position for catching fish.

Figure 5:
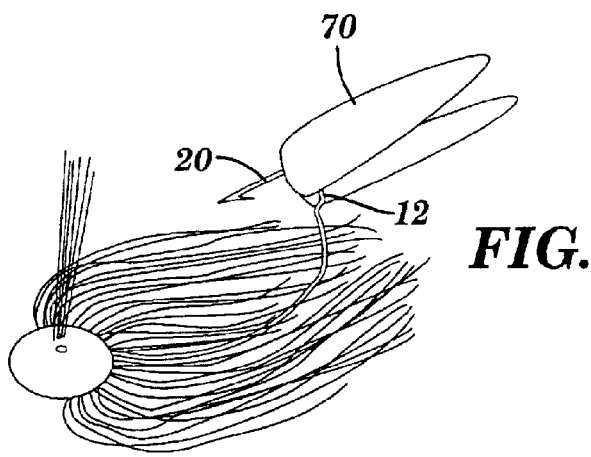
Figure 6:
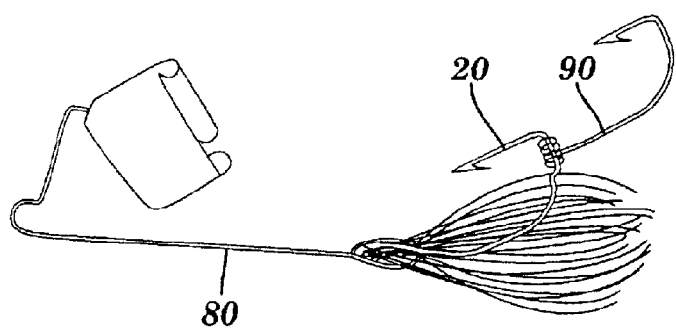

In FIG. 5, a jig is provided at one end of hook 20 to conceal hook 20 and natural pork bait 70 is positioned on offset 12. Again, offset 12 prevents bait 70 from rotating around to undesirable positions on hook 20. FIG. 6 shows hook 20 with a buzz bait at one end of hook 20 and trailer hook 90 positioned on offset 22, increasing the chance of a good catch. Offset 12 optimally positions trailer hook 90 on hook 20 and prevents it from relocating to an undesirable position on hook 20.

The preferred embodiments having now been fully described, it will understood that the invention may be embodied in other specific forms without departing from the spirit or central characteristics of the invention. The present examples and embodiments, therefore, are to be considered in all respects illustrative and not restrictive, and the invention is not to be limited to the details given herein, but by the appended claims.

I claim:

1. A fish hook comprising a wire having a first end adapted for attachment with a line, a second end having a point directed in the general direction of said first end, and an intermediary portion including a shank extending away said first end and a lower portion; said lower portion extending transversely from said shank to said point, said lower portion comprising an offset portion set off from said lower portion by a first distance, said offset portion being substantially straight and positioned closer to an axis of said point than an axis of said shank, said offset portion being arranged substantially parallel to said lower portion, wherein said offset portion is spaced from said point, and formed by a first portion extending from said lower portion at a first substantially right angle, a second portion extending from said first portion at a second substantially right angle, said second portion extending substantially perpendicularly to said point, and a third portion extending from said second portion at a third substantially right angle, said third portion extending to said lower portion and rejoining said lower portion at a fourth substantially right angle.

2. The fish hook of claim 1 wherein said offset portion is formed by a first portion in common and generally in line with said point, a second portion extending from said first portion at a first substantially right angle, said second portion thereby extending substantially perpendicularly to said point, and a third portion extending from said second portion at a second substantially right angle to said lower portion and rejoining said lower portion at a third substantially right angle.

3. The fish hook of claim 1 further comprising a top offset positioned between said first end and said shank, said top offset being substantially parallel with said offset portion.

4. The fish hook of claim 1 wherein said offset portion is at least one eighth as long as said lower portion.

5. The fish hook of claim 1, wherein said offset portion extends a second distance, said second distance being less than half of a length of the lower portion.

6. A fish hook comprising a wire having a first end adapted for attachment with a line, a second end having a point directed in the general direction of said first end, and an intermediary portion including a shank extending away said first end and a lower portion; said lower portion extending transversely from said shank to said point, said lower portion comprising an offset portion set off from said lower portion by a first distance, said offset portion being positioned closer to an axis of said point than an axis of said shank, said offset portion being arranged substantially parallel to said lower portion and extending a second distance, said second distance being less than half the length of the lower portion, wherein said offset portion is spaced from said point, and formed by a first portion extending from said lower portion at a first substantially right angle, a second portion extending from said first portion at a second substantially right angle, said second portion extending substantially perpendicularly to said point, and a third portion extending from said second portion at a third substantially right angle, said third portion extending to said lower portion and rejoining said lower portion at a fourth substantially right angle.

7. The fish hook of claim 6 wherein said offset portion is formed by a first portion in common and generally in line with said point, a second portion extending from said first portion at a first substantially right angle, said second portion thereby extending substantially perpendicularly to said point, and a third portion extending from said second portion at a second substantially right angle to said lower portion and rejoining said lower portion at a third substantially right angle.

8. The fish hook of claim 6 further comprising a top offset positioned between said first end and said shank, said top offset being substantially parallel with said offset portion.

9. The fish hook of claim 6 wherein said offset portion is at least one eighth as long as said lower portion.

10. The fish hook of claim 6 wherein said second and third substantially right angles having radius of curvature sufficiently small to maintain a soft plastic lure on said second portion of said offset.

11. The fish hook of claim 7 wherein said first and second substantially right angles have a radius of curvature sufficiently small so as to maintain a soft plastic lure on said second portion of said offset.

* * * * *